Figure 1:
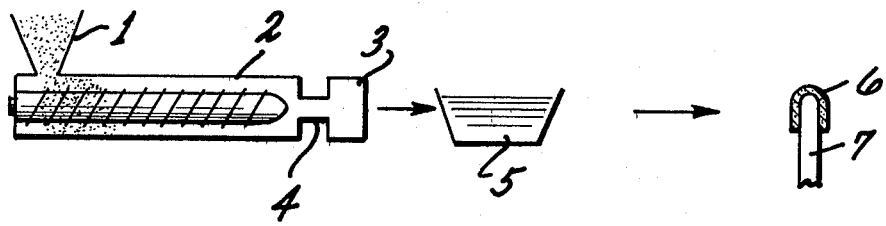

United States Patent [19]

Niwa et al.

[11] Patent Number: 4,464,424

[45] Date of Patent: Aug. 7, 1984

[54] CONCRETE JOINT SEALANT PLATE AND PROCESS FOR MANUFACTURING THEREOF

[75] Inventors: Hazime Niwa; Saburo Furukawa, both of Hiroshima, Japan

[73] Assignee: Aoi Chemical, Inc., Hiroshima, Japan

[21] Appl. No.: 333,561

[22] Filed: Dec. 22, 1981

[51] Int. Cl.³ .................. B05D 1/18; B05D 3/12; C08L 95/00; C09D 3/24
[52] U.S. Cl. .................................. 427/296; 106/277; 427/138; 427/370; 427/442; 427/298
[58] Field of Search .............. 427/294, 298, 296, 370, 427/244, 393.5, 138, 442; 106/277

[56] References Cited

U.S. PATENT DOCUMENTS

| | | | |
|---|---|---|---|
| 2,712,506 | 7/1955 | Farris | 106/277 |
| 3,330,759 | 7/1967 | Henschel et al. | 427/296 X |
| 3,928,680 | 12/1975 | Gannon | 427/296 X |
| 4,186,236 | 1/1980 | Heitmann | 106/277 X |

FOREIGN PATENT DOCUMENTS 2053300  2/1981  United Kingdom ............... 427/296

*Primary Examiner*—Michael R. Lusignan
*Attorney, Agent, or Firm*—Parkhurst & Oliff

[57] ABSTRACT

A method for preparing a concrete joint sealant plate, comprising the steps of impregnating asphalt emulsion into fibrous plate under a reduced pressure and then drying it by means of a heating presser; and a concrete joint sealant plate produced therefrom.

5 Claims, No Drawings

CONCRETE JOINT SEALANT PLATE AND PROCESS FOR MANUFACTURING THEREOF

BACKGROUND OF THE INVENTION (1) Field of the Invention

The present invention relates to a concrete joint sealant plate and process for manufacturing thereof.

(2) Prior Art

In the wide areas of the concrete pavements such as roads, airports (aprons, taxi ways), parking lots, cargo collecting areas, etc., and in the concrete constructions are used various kinds of joint sealant plates such as contraction joint sealants for introducing into a predetermined area cracks due to the contraction of the concrete plates and expansion joint sealants for preventing the blow-up due to the expansion of the concrete plates as the temperature rises, and the construction joint sealants provided from the necessity in constructing. In order to prevent rain water or the like from invading into the base ground and foreign matters from invading into the joints, and to assure the flatness of the concrete plates via the concrete joints, poured joint sealants and joint sealant plates have been heretofore used in the joints.

The conventional joint sealant plates employed for this purpose include (A) the bituminous concrete joint sealant plate which is produced by kneading the bituminous substance, mainly petroleum asphalt, and a filler together, with heating, forming the mixture into a plate, and covering the plate thus produced with asphalt papers on both sides thereof, (B) the bituminous fibre joint sealant plate which is produced by impregnating a fibrous plate with hot-melted petroleum asphalt or petroleum asphalt dissolved into petroleum-base solvent (the latter being called "cutback asphalt"), (C) the foamed joint sealant plate which is obtained by foaming resin or rubber.

However, known bituminous joint sealant plates have the drawbacks that the degree at which the sealant extrudes onto or over the surfaces of the paved concrete plates due to the expansion and contraction of the concrete plate is large and the physical properties of the plates change to a large extent and experience poor recovery following the warm-cold weather cycle. The foamed concrete sealant plate has the drawbacks that it is poor in workability and inconvenient in handling due to its low rigidity; and it is likely to deflect in applying. The bituminous fibre joint sealant plate in which the fibrous plate is impregnated with the hot-melted asphalt has the drawbacks that there are dangers or disadvantages due to the content of the asphalt becoming greater than 65%; the concrete joint sealant plates adhere to one another during storage in summer; its physical properties change to a large extent with the outdoors temperature; and it largely extrudes over or onto the surfaces of the concrete pavement. Further, the bituminous fibre joint sealant plate which is impregnated with the cutback asphalt has the danger that it is likely to catch fire owing to its high content of the organic solvent during the operation of impregnation and drying. This cutback type asphalt fibre joint sealant plate is difficult to produce so as to meet ASTM-D 1751 which is the standard norm specifying the fibre joint sealant plate for building and concrete pavements. ASTM-D 1751 specifies the values as to extrusion, recovery etc. (See Table 2 below)

SUMMARY OF THE INVENTION

Therefore, an object of the present invention is to provide a concrete joint sealant plate free from the above-mentioned drawbacks. More specifically, the object of the present invention is to provide a concrete joint sealant plate characterized by a low extrusion property.

Another object of the present invention is to provide a concrete joint sealant plate characterized by a low bituminous substance content, thereby diminishing the possibility of catching fire during production and storage.

Still another object of the present invention is to provide a concrete joint sealant plate characterized by a small density and good recovery, thereby rendering the handling easier.

A further object of the present invention is to provide a method for preparing a concrete joint sealant plate having a low extrusion property, low fire-catching, small density, good recovery, etc.

These and other objects and advantages according to the present invention will become more apparent from the description of the invention.

DESCRIPTION OF THE PRESENT INVENTION

The present invention will be described in detail below.

The present invention is characterized by the steps of impregnating a fibrous plate with asphalt emulsion under a reduced pressure and then drying it by means of a heating press. According to the present invention, a concrete joint sealant plate which fully meets the standard norm of ASTM-D 1751 can be easily manufactured.

The fibrous plate used in the present invention may include the known plate which is produced by compress-molding a plant-fibrous material such as chein-fibre, straw chip or the like.

Anything will do as the asphalt emulsion used in the present invention so long as the asphalt is emulsified in water by using an appropriate emulsifier. It may contain another conventional additive such as an anti foam-agent. Examples are asphalt emultions commonly used for road pavement (prime coating type, impregnation type).

The content of the asphalt in the asphalt emulsion is preferably from 15 to 20 wt % with respect to the total weight of the asphalt emulsion. If the content is less than 15%, the content of bituminous substance of the concrete joint sealant plate produced therefrom becomes too low, and the plate may not meet the standard norm of ASTM-D 1751. If the content exceeds 20 wt %, it results in a larger danger that the concrete joint sealants produced therefrom are liable to be attached to one another during storage, and the extrusion ratio and recovery ratio thereof are reduced, thereby rendering them unfit for the standards prescribed by the ASTM-D 1751. The emulsifier used in the asphalt emulsion will not be restricted to a specific one so long as it can render the asphalt into an emulsion.

According to the present invention, it is necessary to impregnate the fibrous plate with the asphalt emulsion under a reduced pressure. If the impregnation is carried out under an insufficient pressure, the asphalt emulsion will not be satisfactorily impregnated into the fibrous plate. Although the reduced pressure is not restricted to a specific one, for instance, the present invention is effected under the pressure of 10-40 /mm Hg. Since the asphalt emulsion can be instantly impregnated into the fibrous plate under the reduced pressure, a few or several minutes are enough in the process of impregnation. The content of the asphalt impregnated into the fibrous plate is preferably from 35-50 wt % relative to the total weight of the concrete joint sealant plate. If the content is less than 35 wt %, such a content of the asphalt does not meet the standards prescribed by ASTM. If it exceeds 50 wt %, the sealant does not meet the standards prescribed in the ASTM with respect to the recovery.

According to the present invention, the fibrous plate into which the asphalt emulsion is impregnated is then dried and molded into a fixed shape by using a heating presser. By drying and molding using the heating presser, the concrete joint sealant plate thus obtained has a finished shape as prescribed in the standards of ASTM and enough strength, resistance and workability required during the handling. Furthermore, the concrete joint sealant plate according to the present invention is more excellent than other concrete joint sealants in terms of qualities.

In the following, the present invention will now be explained with reference to specific examples which are merely illustrative of this invention and never aimed at limiting the gist of the present invention.

EXAMPLE 1

Preparation of Asphalt Emulsion

Into 200 g of hot water heated up to 50°-60° C. were added 1 g of surface-active agent, 0.7 g of conc. hydrochloric acid, 1 g of anhydrous potassium chloride and 0.5 g of an anti-foaming agent under stirring to form a homogeneous solution. Next, 200 g of straight asphalt pre-heated up to and melted at 145° C. was dropped into the solution thus obtained under stirring using a homogenizing mixer for 3-5 minutes to form a homogeneous asphalt emulsion.

EXAMPLE 2

Preparation of Asphalt Emulsion

Into 300 g of hot water heated up to 50°-60° C. were added 1.0 g of conc. hydrochloric acid and 2.0 g of anhydrous potassium chloride under stirring to form a homogeneous solution. 200 g of straight asphalt melted at 135°-145° C. dissolving 1.8 g of surface active agent was dropped into the solution thus obtained under stirring using the homogenizing mixer to form a homogeneous asphalt emulsion.

The physical properties of the asphalt emulsions obtained in Examples 1 and 2 are shown in Table 1.

TABLE 1

| Physical properties | Example 1 | Example 2 |
| --- | --- | --- |
| Specific gravity | 1.029 | 1.018 |
| Viscosity (cps) | 20.6 | 15.7 |
| pH | 6.4 | 5.4 |
| Storage stability* | good | good |
| Low temperature resistance (5° C.)** | — | good |

*Test sample was left at room temperature for two months to evaluate the storage stability. ("good" means substantially no separation of the emulsion.)
**Test sample charged up to the height of 200 mm in a glass tube was left at 5° C. for 45 hours to evaluate the low temperature resistance. ("good" means that the height of supernatant liquid is less than 7 mm)

Preparation Method of the Concrete Joint Sealant Plate

The asphalt emulsion prepared in Example 2 was adjusted to an emulsion containing 20% by weight of asphalt in an emulsion preparation tank. After the 20% emulsion preparation, the emulsion was charged into an impregnation tank in which fibrous plates were piled up. The pressure in the impregnation tank was reduced to from 10 mmHg to 40 mmHg and then the fibrous plates were left for a few or several minutes. The fibrous plates thus impregnated with the emulsion were taken out of the impregnation tank and heated for drying under the pressing pressure of from 80 to 90 kg/cm² for from 10 to 15 minutes by means of a heating presser at 157° to 165° C., thereby producing bituminous concrete joint sealant plates according to the present invention in which only asphalt remained in the fibrous plates.

Table 2 shows the results obtained from the experiments on the above products as to the concrete joint sealant plates for construction matters, or concrete pavement, extrusion, bituminous type in accordance with the standards of ASTM-D 1751. For reference purpose, the standard values in this ASTM-D 1751 as well as the physical properties of the conventionally hot-melted petroleum asphalt-impregnated and cutback asphalt-impregnated concrete joint sealant plates are also shown. In the table, the thicknesses of the hot-melted asphalt-impregnated or cutback asphalt-impregnated concrete joint sealant plates and the concrete joint sealant plate No. 1 according to the present invention were 10 mm, while that of the concrete joint sealant plate No. 2 according to the present invention was 20 mm.

TABLE 2

| Experiment Items | Heat-fused asphalt-impregnated sealant plate | 30% cutback asphalt-impregnated concrete sealant | Present invention No. 1 | Present invention No. 2 | ASTM-D 1751 standard values |
| --- | --- | --- | --- | --- | --- |
| ¼ compression strength (Kg/cm³) | 162.7 | 63.9 | 68.5 | 51.2 | 7-87.9 |
| Recovery (%) | 64.9 | 68.7 | 77.8 | 73.5 | more than 70 |
| Extrusion (mm) | 4.5 | 0.7 | 0.4 | 0.5 | less than 6.4 |
| Water absorption rate (%) | 1.8 | 5.2 | 8.8 | 8.2 | less than 15 |
| Resistance in handling | good | good | good | good | no deformation or fracture |
| Bituminous substance loss (%) | 0 | 0 | 0 | 0 | less than 3 |
| Density (g/cm³) | 0.89 | 0.47 | 0.49 | 0.44 | more than 0.3 |
| ASTM D545 test (1/10 mm) | 74 | 170 | 170 | 170 | 2-200 |
| Bituminous substance content (%) | 68.9 | 33.8 | 35.1 | 35.1 | more than 35 |
| Weathering test | good | good | good | good | no fracture |

TABLE 2-continued

| Experiment Items | Heat-fused asphalt-impregnated sealant plate | 30% cutback asphalt-impregnated concrete sealant | Present invention No. 1 | Present invention No. 2 | ASTM-D 1751 standard values |
| --- | --- | --- | --- | --- | --- |
| Specific gravity | 0.9 | 0.75 | 0.5 | 0.5 | no stipulation |

As obvious from the above results, the concrete joint sealant plate according to the present invention can meet the requirements specified in the ASTM-D 1751 although the conventional concrete joint sealant plates can not meet all of them.

According to the present invention, it is possible to easily obtain the concrete joint sealant plate which can comply with all the requirements specified in ASTM-D 1751. Further, since no organic solvent is employed in the present invention, the concrete joint sealant plate is free from the air-pollution and has a low danger of fire-catching and it is inexpensively produced even when the price of petroleum products becomes high. Furthermore, the concrete joint sealant plate according to the present invention has a small density (specific gravity 0.5: See Table 2) and is easy to handle, thereby rendering the transportation cost lower. In addition, since it can easily absorb the expansion and contraction of the concrete, it can be employed in places where the expansion and contraction is vigorous.

As understood from the above, the present invention can be modified in various ways without departing from the spirit of the present invention.

Having thus described the invention, what is claimed as novel and described to be secured by Letters Patent of the United States of America is:

1. A method for preparing a concrete joint sealant plate, comprising impregnating a fibrous plate with an aqueous asphalt emulsion under a reduced pressure and then drying it by means of a heating presser.

2. The method claimed in claim 1, wherein the content of the asphalt impregnated into the fibrous plate is in the range of from 35 to 50 weight % with respect to the concrete joint sealant plate.

3. The method claimed in claim 1, wherein the content of asphalt in the asphalt emulsion is in the range of from 15 to 20 wt %.

4. The method claimed in claim 2, wherein the content of asphalt in the asphalt emulsion is in the range of from 15 to 20 wt. %.

5. The method claimed in claim 1, wherein said reduced pressure is in the range of 10–40 mm Hg.

* * * * *

UNITED STATES PATENT AND TRADEMARK OFFICE
CERTIFICATE OF CORRECTION

PATENT NO. : 4,464,424

DATED : August 7, 1984

INVENTOR(S) : HAZIME NIWA et al

Figure 2:
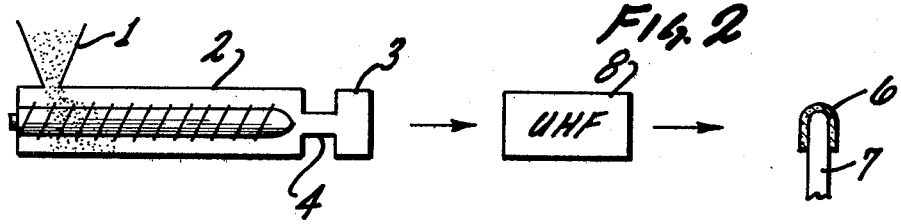
Figure 3:
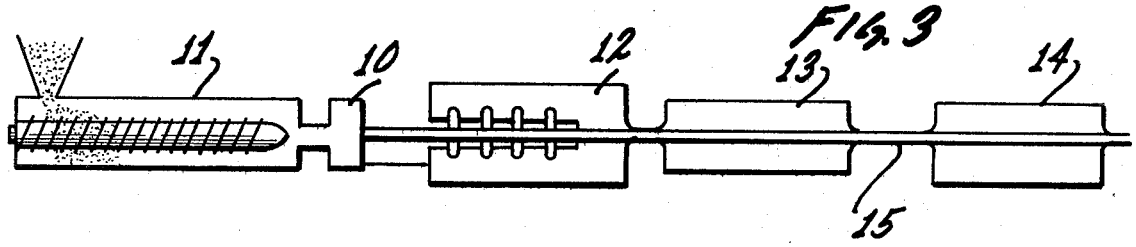
Figure 3A:
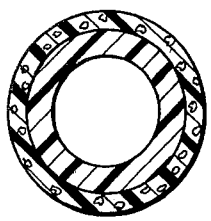
Figure 4:
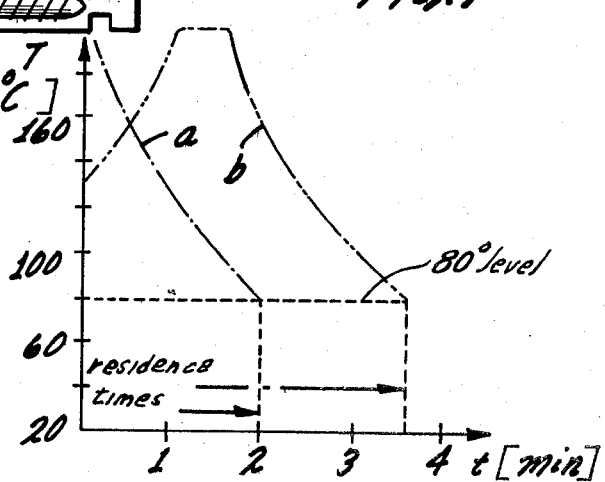

It is certified that error appears in the above-identified patent and that said Letters Patent is hereby corrected as shown below:

Delete Figures 1, 2, 3, 3a and 4.

This certificate applies to the Grant only.

Signed and Sealed this

Thirty-first Day of December 1985

[SEAL]

Attest:

DONALD J. QUIGG

Attesting Officer

Commissioner of Patents and Trademarks